(12) United States Patent
Sheymov

(10) Patent No.: US 7,752,432 B2
(45) Date of Patent: Jul. 6, 2010

(54) SYSTEMS AND METHODS FOR CREATING A CODE INSPECTION SYSTEM

(75) Inventor: Victor I. Sheymov, Vienna, VA (US)

(73) Assignee: Invicta Networks, Inc., Reston, VA (US)

(*) Notice: Subject to any disclaimer, the term of this patent is extended or adjusted under 35 U.S.C. 154(b) by 1157 days.

(21) Appl. No.: 11/367,698

(22) Filed: Mar. 6, 2006

(65) Prior Publication Data
US 2006/0212723 A1 Sep. 21, 2006

Related U.S. Application Data

(63) Continuation of application No. 10/074,037, filed on Feb. 14, 2002, now Pat. No. 7,010,698.

(60) Provisional application No. 60/268,369, filed on Feb. 14, 2001.

(51) Int. Cl.
G06F 9/00 (2006.01)

(52) U.S. Cl. .................. 713/151; 713/165; 713/167; 713/168

(58) Field of Classification Search ............. 713/151, 713/165, 167, 168
See application file for complete search history.

(56) References Cited

U.S. PATENT DOCUMENTS

| 5,289,540 | A | 2/1994 | Jones |
| 5,359,659 | A | 10/1994 | Rosenthal |
| 5,548,746 | A | 8/1996 | Carpenter et al. |
| 5,842,002 | A | 11/1998 | Schnurer |
| 5,887,131 | A | 3/1999 | Angelo |
| 5,949,999 | A | 9/1999 | Song et al. |
| 5,983,348 | A | 11/1999 | Ji |
| 5,999,723 | A | 12/1999 | Nachenberg |
| 6,071,317 | A | 6/2000 | Nagel |
| 6,272,641 | B1 | 8/2001 | Ji |

FOREIGN PATENT DOCUMENTS

WO 98/19419 5/1998

OTHER PUBLICATIONS

Hartley, Bruce V.: "Honeypots: A New Dimension to Intrusion Detection" Internet Security Advisor, [Online] Jul. 2000, pp. 1-2, XP002472280 Retrieved from the Internet: URL: http://1pM vi sec.com/GMTest2/arti Cl es/hartbI0.pdf> [retrieved on Mar. 11, 2008].

(Continued)

Primary Examiner—Thomas Peeso
(74) Attorney, Agent, or Firm—Carlos R. Villamar; Roberts Mlotkowski Safran & Cole P.C.

(57) ABSTRACT

A code inspection system produces a dynamic decoy machine that closely parallels one or more protected systems. The code inspection system can analyze and monitor one or more protected systems, and as those protected systems are updated, altered or modified, the dynamic decoy machine, in which potentially malicious code is tested, can also be updated. Thus, the dynamic decoy machine can accurately reflect the current state of the one or more protected systems such that the potentially destructive nature, if any, of suspicious code can be evaluated as if it were in the actual environment of the protected system, without jeopardizing the security of the protected system.

30 Claims, 2 Drawing Sheets

OTHER PUBLICATIONS

Networks Associates Technology Inc: "CyberCop Sting—Getting Started Guide—Version 1.0"[Online] May 1999, pp. 1-30, XP002472432 Retrieved from the Internet: URL:http://www.scn.rain.com/{neighorn/PDF/Cstguide.pdf> [retrieved on Mar. 12, 2008].

Spitzner Lance: "To build a honeypot" Internet Citation, [Online] Oct. 10, 1999, XP002952578 Retrieved from the Internet: URL: http ://web.archive. org/web/19991013141306/ http://enteract com. {1 spitz /honeypot.htm > [retrieved on Jun. 28, 2002].

European Patent Office Supplementary Search Report for Patent Application No. EP 02 72 3146; Mailed Mar. 12, 2008.

PCT (PCT/US/02/04267) International Search Report date of mailing Jun. 14, 2002.

International Preliminary Examination Report date of mailing Dec. 4, 2002.

Dahlia Malkhi, et al.; "Secure Execution of Java Applets Using a Remote Playground"; AT&T Labs Research, Florham Park, NJ; 1988 IEEE; pp. 40-51.

John Pescatore; "Secure Use of the World Wide Web: Keeping Browsers and Servers From Getting Snared"; Trusted Information System; ISBN# 0-7803-3277-6; pp. 36-38.

RSA Security; "Are Passwords Really Free? A Closer Look at the Hidden Costs of Password Security"; pp. 1-8.

SYSTEMS AND METHODS FOR CREATING A CODE INSPECTION SYSTEM

RELATED APPLICATION DATA

This application claims the benefit of and priority to U.S. Provisional Application Ser. No. 60/268,369, filed Feb. 14, 2001, entitled "VM/Test Chamber/Backup OS and Applications Builder," which is incorporated herein by reference in entirety.

BACKGROUND OF RELATED ART

1. Field of the Invention

This invention relates to systems and methods for protecting computers. In particular, this invention relates to systems and methods for protection of computers and other devices from malicious code such as viruses, spyware, undesirable code, or the like.

2. Description of Related Art

Malicious codes such as viruses, worms, spyware, etc., can cause substantial damage to computers and other devices. Known systems that protect against malicious code are typically based on an analysis of a code before it is accepted by a computer. This analysis is usually based on a comparison of the code in question with a collection of known malicious codes contained in a "library." If a substantial similarity is found between the code in question and a code in the library, the code is declared malicious or potentially malicious and is not accepted by the protected computer for further processing.

Detection of malicious code, such as a worm or virus, and a determination of the associated potentially devastating effects can be determined using a test chamber, such as that described in U.S. Pat. No. 5,842,002, incorporated herein by reference in its entirety.

A test chamber is a static hardware model of a protected system, such as a computer. Questionable code, such as an incoming e-mail message is placed in such a test chamber where the conditions of the actual protected system are simulated. A malicious code reacting to such simulated conditions would act according to its designed purpose in this environment. Most common types of such action would be destruction of computer files and/or replication and an attempt to spread the replicas to other computers within a given environment, such as over a LAN or via e-mail. Upon detection of such activities within the test chamber, or upon destruction of all or a portion of the test chamber, the code in question can be declared malicious and not forwarded to the protected computer.

In cases where malicious activity is not detected, the code is deemed safe and passed to the protected computer. For example, upon completion of a scan of an e-mail, and no malicious code within the e-mail detected, the e-mail can be forwarded to the protected computer.

SUMMARY OF THE INVENTION

However, the above methods have at least one inherent deficiency based on the fact that, by definition, they can only detect a previously know malicious code. A previously unknown code, or a code not contained in the "library" of codes would be accepted for further processing by the protected system, thereby "infecting" the protected system. Additionally, establishing an optimal level of similarity between the, library and potentially malicious codes presents a substantial difficulty since too general of a criteria of similarity can produce a high level of false positive alerts, while a too specific criteria can produce a high level of false negative results.

The static test chamber system allows for the detection of malicious code that can be incorporated into files or applications, such as an e-mail or program, or that may be self-executing. However, many malicious codes are designed to interfere with a specific operating system, a specific application, upon a specific function being performed, or on some other or combination of triggering activities. Thus, in order to have a test chamber that could account for all of the variables, the test chamber would either need to duplicate a large number of combinations of operating systems and applications, or there would need to be a plurality of test chambers duplicating different combinations of operating systems and applications. The situation is further complicated by the fact that many operating systems and applications themselves are represented by a variety of releases, different versions, and-updates. All of the above variables make it difficult to effectively create and maintain test chambers that can be readily and economically maintained and upgraded.

A more attractive approach is to concentrate on the results of accepting a code in question. Obviously, testing a questionable code in an actual protected computer is not acceptable. However, generally it is possible to test a questionable code in a sacrificial "buffer" computer, using it as a "test chamber." Nevertheless, the practicality of this approach is highly questionable for the following reasons. If the "buffer" computer is an actual computer, this would require a user to purchase two computers instead of one, and would eventually double the number of computers required to perform the same tasks. If the "buffer" computer is a "virtual machine," this would require creating "virtual machines" for every release of every operating system. Furthermore, because malicious codes are often targeting specific applications, with both scenarios, the "buffer" machine has to contain a copy of every application of the actual protected computer. The frequency of new releases of operating systems and software applications by all vendors creates such a large number of variations to be duplicated by the protective system that it makes the approach even less practical.

One exemplary embodiment of the systems and methods of this invention allows for the automatic building and updating of a dynamic decoy machine (DM) based on a protected system. The DM can reside in the protected system, outside and connected to the protected system, as a standalone system, or a combination thereof. As the protected system goes through updates, modifications and additions, the protected system is automatically duplicated in the DM. Therefore the DM's configuration closely parallels that of the protected computer.

The exemplary methods and systems for detecting a malicious code and preventing it from being further processed by a protected computer or other device are based on, for example, the following principals. The inspection of a questionable code is based on what that code could do to a protected machine and/or its software applications and/of hardware rather than of how the questionable code looks. The protection methods and systems automatically create a code inspection system that is an accurate software copy of the protected computer or device, including relevant software applications residing on the protected machine. The code inspection system automatically updates-itself, reflecting software application additions and deletions in the protected computer as well as changes in configurations. The code inspection system contains "actuators" which emulate the normal or typical use of the protected machine, i.e., opening and closing of applications, accessing of files, or the like. The code inspection system also contains a "clock accelerator" which is running the code clock to emulate passage of sufficient time on order to trigger time-delayed malicious codes. Additionally, the code inspection system contains sensors detecting negative impact of a questionable code on the protected machine.

In accordance with an exemplary embodiment of this invention, the code inspection system (CIS), comprises two major parts: a code inspection management module and a dynamic decoy machine (DM). The dynamic decoy machine (DM) further comprises two major parts: an actuator module and a sensor module. These various sensor modules can be added to the dynamic decoy machine's configuration during installations and upgrades that occur on the protected machine, or based on some other predetermined configuration.

Inspection of the questionable code by the code inspection system is performed within the dynamic decoy machine. During the inspection of incoming code, if the questionable code contains malicious code with destructive capabilities, the DM can be partially or fully destroyed or damaged, without affecting the protected system.

The actuator module emulates normal use of the protected machine, i.e., it opens and closes applications, accesses files, sends various communications, manipulates user definable parameter values, or the like, as well as "accelerating the clock" of the DM in order to trigger time-triggered malicious codes. Emulation of the normal use of the protected machine can be pre-programmed and/or updated by the MU based on the use of the protected machine.

The sensors module comprises sensors that detect undesirable actions of the questionable code. These undesirable actions can be broadly divided into three categories: command-based, access-based, and unauthorized modification based. Command-based sensors detect the invocation of one or more undesirable commands. Typical examples could be such commands as "delete." Access-based sensors detect a questionable code's attempt to access undesirable areas of the DM such as an "address book," registry, or the like. Unauthorized modification based sensors detect violations of the integrity of the files, such as violations of the check-sum or other authentication algorithms.

The exemplary embodiments of this invention can be performed by a computer program, hardware, or a combination thereof which resides within, outside, or a combination of inside and outside of a protected system. The code inspection system detects installations and upgrades to the protected system's operating system, installation and updates of applications, or the like, and upon such installation process, creates a duplicate of the installed software in the dynamic decoy machine. Thus, the dynamic decoy machine can be a virtual, stand alone, or dedicated dynamic decoy machine such that the configuration of the dynamic decoy machine parallels that of one or more protected computers.

The substantial duplication of pertinent aspects of the protected system in the dynamic decoy machine can be performed during changes to the protected machine's operating system, applications, and files, and those changes duplicated in the DM, thus constantly updating the DM. Alternatively, the duplication can be performed at a predetermined time, regularly or irregularly, or it can be time-based or event-based. The code inspection management module can also receive signals from the DM indicating violations detected by the sensors and block passage of the questionable code deemed undesirable to the protected machine. If the code is not declared undesirable, the code inspection management unit can deliver the code to the protected machine for further processing. For example, the systems and methods of this invention can be used in conjunction with copending U.S. Ser. No. 09/571,377, entitled "Method of Communications and Communication Network Intrusion Protection Methods and Intrusion Attempt Detection System," incorporated herein by reference its entirety.

Furthermore, and in accordance with a second exemplary embodiment of the systems and methods of this invention, the code inspection system can maintain one or more dynamic decoy machines. In this embodiment, the first dynamic decoy machine can be used as the actual dynamic decoy machine in which potentially malicious code is evaluated, while the second dynamic decoy machine can act as a backup to rebuild one or more of the first dynamic decoy machine or the protected system should a recovery be necessary. Likewise, by maintaining a backup of the dynamic decoy machine, the backup dynamic decoy machine can be used in the case of accidental damage to the protected computer's operating systems and/or applications.

The mirroring of the protected system by the code inspection system can be performed during upgrades of an operating system or an application. Alternatively, the mirroring can be performed at a predetermined time, the only drawback being the fact that the code inspection system may not always exactly reflect the protected system. While the code inspection system is substantially identical of that of the protected computer, the code inspection system, for example, may or may not have the same IP address, can have embedded therein sensors and recovery tools should malicious code destroy all or a portion of the software and/or hardware of the code inspection system, or the like.

Aspects of the presents invention relate to computer security. In particular, the exemplary embodiments of the systems and methods of this invention relate to creation and updating of a code inspection system (CIS).

Aspects of the present invention also relate to systems and methods that are capable of maintaining a code inspection system as a protected system is modified.

Aspects of the present invention additionally relate to systems and methods of building and updating a code inspection system based on a protected computer.

Aspects of the present also relate systems and methods that allow for a complete or partial recovery of protected system based on information stored in one or more code inspection systems.

These and other features and advantages of this invention are described in or apparent from the following detailed description of the embodiments.

BRIEF DESCRIPTION OF THE DRAWINGS

The embodiments of the invention will be described in detail, with reference to the following figures wherein.

DETAILED DESCRIPTION OF THE INVENTION

An exemplary embodiment of the systems and methods of this invention allow a code inspection system to produce a dynamic decoy machine that closely parallels one or more protected systems. For example, the code inspection system can analyze and monitor one or more protected systems as those protected systems are updated, altered or modified. The CIS, in which potentially malicious code is tested, can also be updated. Thus, the CIS system can accurately reflect the current state of one or more protected systems such that the potentially destructive nature, if any, of suspicious code can be evaluated as if it were in the actual environment of the protected system, without jeopardizing the security of the protected system.

Figure 1:
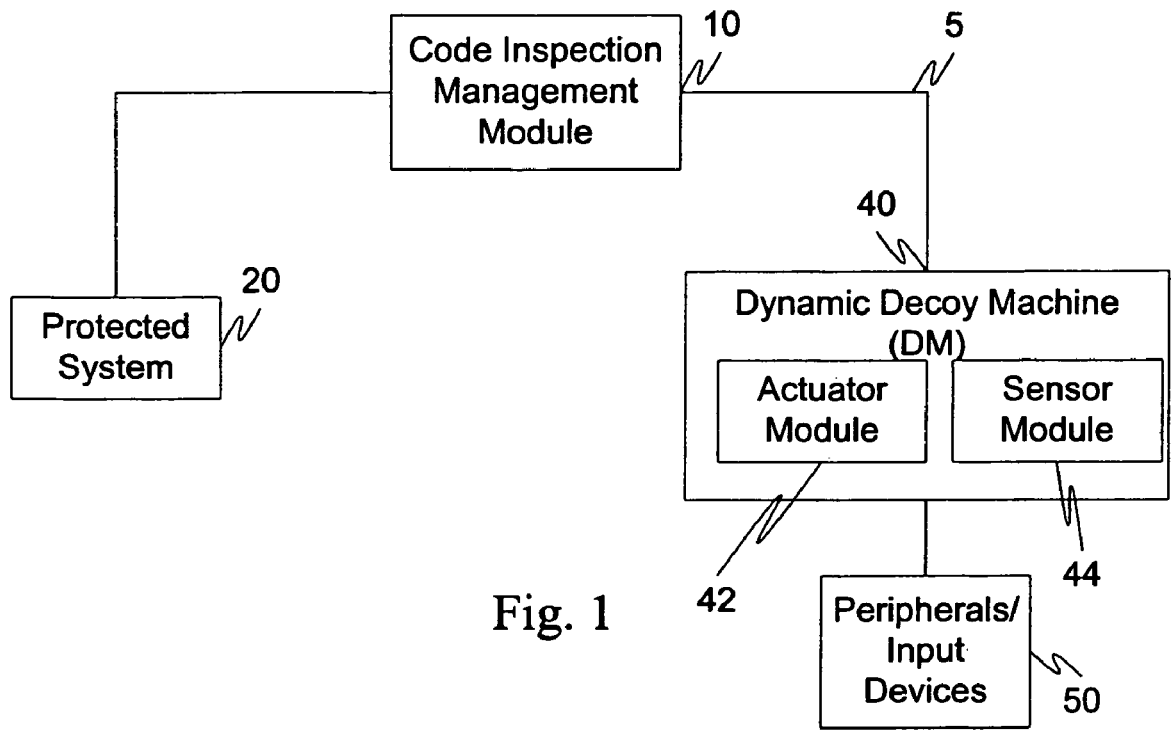
FIG. 1 is a functional block diagram illustrating an exemplary code inspection system according to this invention.

FIG. 1 illustrates an exemplary code inspection system. In particular, the code inspection system comprises a code inspection management module 10, one or more protected systems 20, associated peripherals and input devices 50, and a dynamic decoy machine 40, all interconnected by link 5. Additionally, the dynamic decoy machine 40 comprises one or more actuator modules 42 and one or more sensor modules 44.

Figure 2:
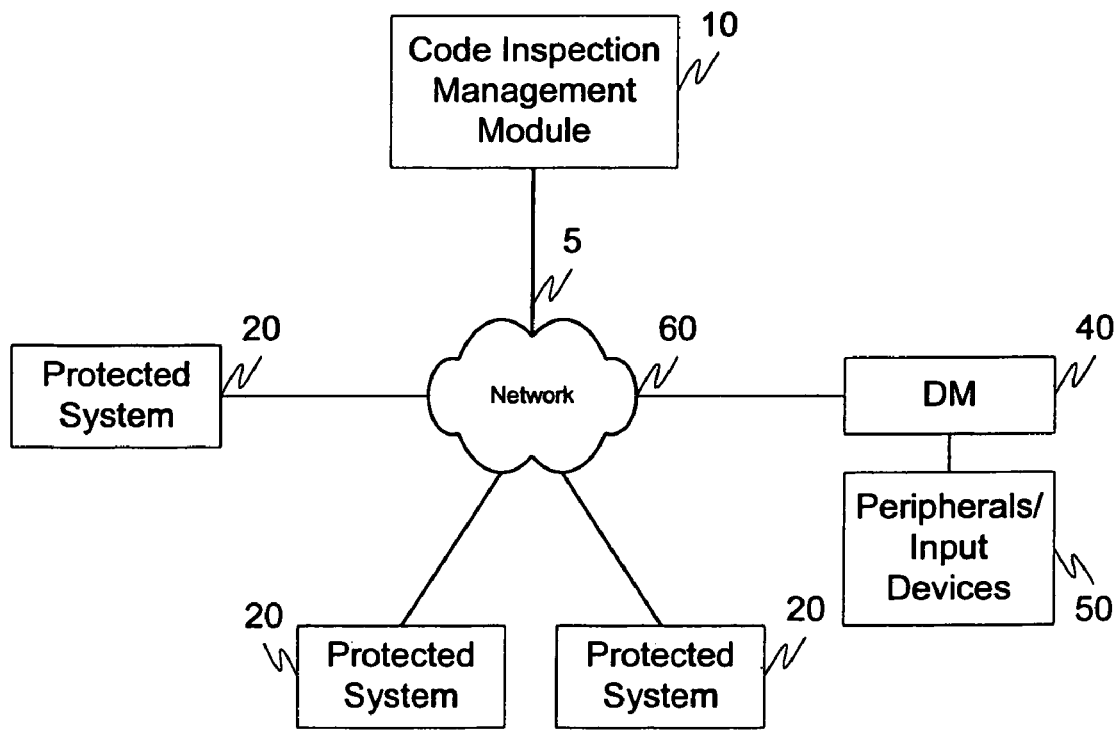
FIG. 2 is a functional block diagram illustrating a second exemplary code inspection system according to this invention.

While the exemplary embodiment illustrated in FIGS. 1-2 show the code inspection system and associated components collocated, it is to be appreciated that the various components of the code inspection system can be located a distant portions of a distributed network, such as a local area network, a wide area network, and intranet and/or the internet, or within a dedicated code inspection management system, within separate partitions of a hard drive, such as the hard drive of the protected system, or the like. Thus, it should be appreciated that components of the code inspection management system can be combined into one device or collocated on a particular node of a distributed network. As will be appreciated from the following description, and for reasons of computationally efficiency, the components of the code inspection system can be arranged at any location within a distributed network without affecting the operation of the system.

Furthermore, the links 5 can be a wired or a wireless link or any other known or later developed element(s) that is capable of supplying and communicating electronic data to and from the connect elements. Additionally, the peripherals and input devices 50 can be, for example, a keyboard, a mouse, a speech-two-text converter, a computer monitor, a display, or the like. Furthermore, while the exemplary embodiments are described in relation to the protected system 20 being a computer and associated peripherals and input/output devices 50, it is to be appreciated that a protected system 20 can include a plurality of computer systems, a network, one or more subsets of applications and/or operating systems running on a computer, a LAN, or the like. In general, the code inspection management system can be scaled to any size and an associated code inspection system built.

In particular, FIG. 2 illustrates an exemplary embodiment that can comprise one or more protected systems 20 and associated peripherals and input/output devices 50. In this exemplary embodiment, the one or more protected systems 20 can be emulated by the code inspection management module 10 in the dynamic decoy machine 40 such that, for example, the effects of potentially malicious code on the entirety of the network determined.

In operation, the code inspection management module 10 determines whether the protected system 20 is a new system. If the protected system 20 is new, the code inspection management module 10 initializes a dynamic decoy machine 40 that will be used to test potentially malicious code. In particular, the code inspection management module 10 monitors the status of the protected system 20 and updates the dynamic decoy machine 40 as the protected system 20 is built, configured, and operating systems and applications installed. Furthermore, along with paralleling the structure of the protected system 20, the code inspection management module 10 can also embed in the code inspection system 40 one or more sensor modules 44 and actuator modules 42 that monitor, detecting, track, and/or disable malicious code. This paralleling can be performed, for example, by copying files from the protected system to the dynamic decoy machine 40, or by a parallel installation process. Thus, upon a potentially malicious code being introduced to the dynamic decoy machine to determine its effects, and the actuator module 42 running the dynamic decoy machine through an exemplary operating scenario, the sensor module 42 can monitor and determine, for example, the operation of the malicious code.

For example, the dynamic decoy machine 40 can act as an intermediary or interface between the protected system and one or more other unprotected systems or devices from which potentially malicious code could originate. Specifically, the code inspection system can be arranged such that the dynamic decoy machine, cooperating with the code inspection management module 10, acts as a screening interface for all or a portion of received code. This interface can be seamless such that other users and systems are unaware that they are only in communication with the protected system via the dynamic decoy machine. As an example, the dynamic decoy machine could maintain the IP address to which all or a portion of the communications destined for the protected system are routed. As an alternative, the code inspection management module 10 and dynamic decoy machine 40 can act as an interface between, for example, the input devices for the protected system, such as the floppy or CDROM drive, and all or a portion of the code destined for the protected system routed through the dynamic decoy machine. Specifically, the code inspection system could be incorporated into, for example, the BIOS or operating system of a computer or a hard drive. Therefore, the code inspection system would have the capability of intercepting all or a portion of the inputs to the protected system.

Alternatively, code inspection management module 10 can be introduced to produce a code inspection system that mirrors one or more protected systems 20 already in existence. In this example, the code inspection management module 10 analyzes the protected system 20 to determine, for example, the installed operating system, installed applications, installed peripherals and input/output devices, or the like, and creates the dynamic decoy machine 40 based on the protected system 20.

In addition to the operating system and applications installed on the protected system 20 that are duplicated in the dynamic decoy machine 40, the code inspection management module can emulate the one or more peripherals and input devices 50 that are connected to the protected system 20 in a manner known as a "virtual machine."

In this example, not only is the software replicated in the dynamic decoy machine 40 but also the hardware components. This can be useful, for example, where a potentially malicious code would activate to produce an output on one or more of the peripheral devices. This process can be simplified in a case when the simple fact of questionable code attempting to access an input/output device or a peripheral is deemed undesirable or malicious in itself.

Upon completion of creating the dynamic decoy machine 40, the code inspection system can verify the integrity of the dynamic decoy machine 40. For example, the code inspection management module 10 can run a comparison between the protected system 20 and the dynamic decoy machine 40 to ensure the systems are substantially identical, or will perform substantially identically under a given exposure to potentially malicious code, except, for example, any actuator modules 42 and sensor modules 44 the code inspection management module 10 may have embedded in the dynamic decoy machine 40.

As with a dynamic decoy machine being developed in conjunction with a newly built computer, once the dynamic decoy machine has been aligned with the protected system 20, the code inspection management module 10 monitors the protected system 20 for any updates, installations, or modifications. Upon any one or more of these triggering events, the code inspection management module 10, via link 5, can update the dynamic decoy machine 40 as well as update and/or add to the actuator and sensor modules.

For example, the code inspection management module 10 can act as a mirroring device, wherein the protected system 20 is exactly duplicated in the dynamic decoy machine 40. Alternatively, only portions of the protected system pertinent to the anticipated undesirable effects can be duplicated.

In addition to the dynamic decoy machine 40 being used to test potentially malicious code, as previously discussed, the dynamic decoy machine 40 can be used as a backup system. In particular, if one or more portions of the protected system 20 are damaged, all or a portion of the protected system 20 could be recovered from the dynamic decoy machine 40 since the dynamic decoy machine 40 is a substantial duplicate of the protected system 20. Thus, during a recovery operation, the code inspection management module 10 can remove any sensor modules or actuator modules that were embedded in the dynamic decoy machine during the dynamic decoy machine's creation.

The actuator module 42 acts in cooperation with the code inspection management module 10 place the dynamic decoy machine through various operational sequences in an effort to trigger a piece of malicious code. For example, the operational sequences can be based on a profile of expected actions of the malicious code. Thus, if an e-mail is received, the actuator module 42 could open the e-mail, and the sensor module 44 watch for access to, for example, the address book. Alternatively, if an executable is downloaded from, for example, the internet, the actuator module 42 can execute the program and the sensor module 44 monitor the registry, and any commands, such as the delete command, and, for example, halt execution of the dynamic decoy machine 40 and delete the malicious code. Alternatively, the code inspection system, upon-detection of malicious code, can attempt to remove unauthorized portions of, or "disinfect," the malicious portion of the infected code. In general, the actuator module is capable of automatically simulating operating conditions of the protected system in the dynamic decoy machine.

Furthermore, the actuator module can also be dynamic and monitor the operation of the protected system. Thus, the actuator model is capable of more accurately reflecting the operational sequences of the protected system. For example, the actuator module, in conjunction with a memory device, not shown, can track a predetermined number of operation sequences in the protected machine. These operational sequences, either in whole or part, can then be executed, with or without additional operational sequences, in the dynamic decoy machine.

The sensor module 44 can monitor, for example, changes in file sizes, access attempts to particular portions of the dynamic decoy machine, command line statements, inputs and outputs of the potentially malicious code, or the like. Thus, the sensor module 44 can react to not only how a potentially malicious code looks, but how it acts. For example, the systems and methods of this invention can work in conjunction with traditional test chamber type systems that detect malicious code based on a matching technique. Thresholds can then be set that declare a code malicious based on its activity. For example, it may be desirable to declare all codes malicious that attempt to access the address book of a mail program. Alternatively, if any code attempts to execute a command that code may be declared malicious. In general, the sensor module, or a plurality of sensor modules, can be installed the in the dynamic decoy machine to detect any type of activity, and especially any type of unwanted activity.

FIG. 2 illustrates an exemplary embodiment where there are one or more protected systems 20, and the dynamic decoy machine 40, in cooperation with the code inspection management module 10, is capable of duplicating not only the environments within each protected system, but also the network settings. Network settings can include, for example, LAN, intranet and internet type environments. Thus, for this exemplary embodiment, the dynamic decoy machine 40 may not be simply a stand alone computer, but rather a collection of hardware and/or software that may include, for example, a duplicate of the network environment established between a plurality of protected systems. As with the previous embodiment, the code inspection management module 10, in cooperation with the dynamic decoy machine 40, monitors the status of the one or more protected systems 20 and the network 60 such that the dynamic decoy machine 40 is an accurate representation of the configuration of the one or more protected systems. Thus, when a potentially malicious code is introduced to the dynamic decoy machine for testing, an accurate representation of how the malicious code may act on one or more of the protected systems can be determined.

Figure 3:
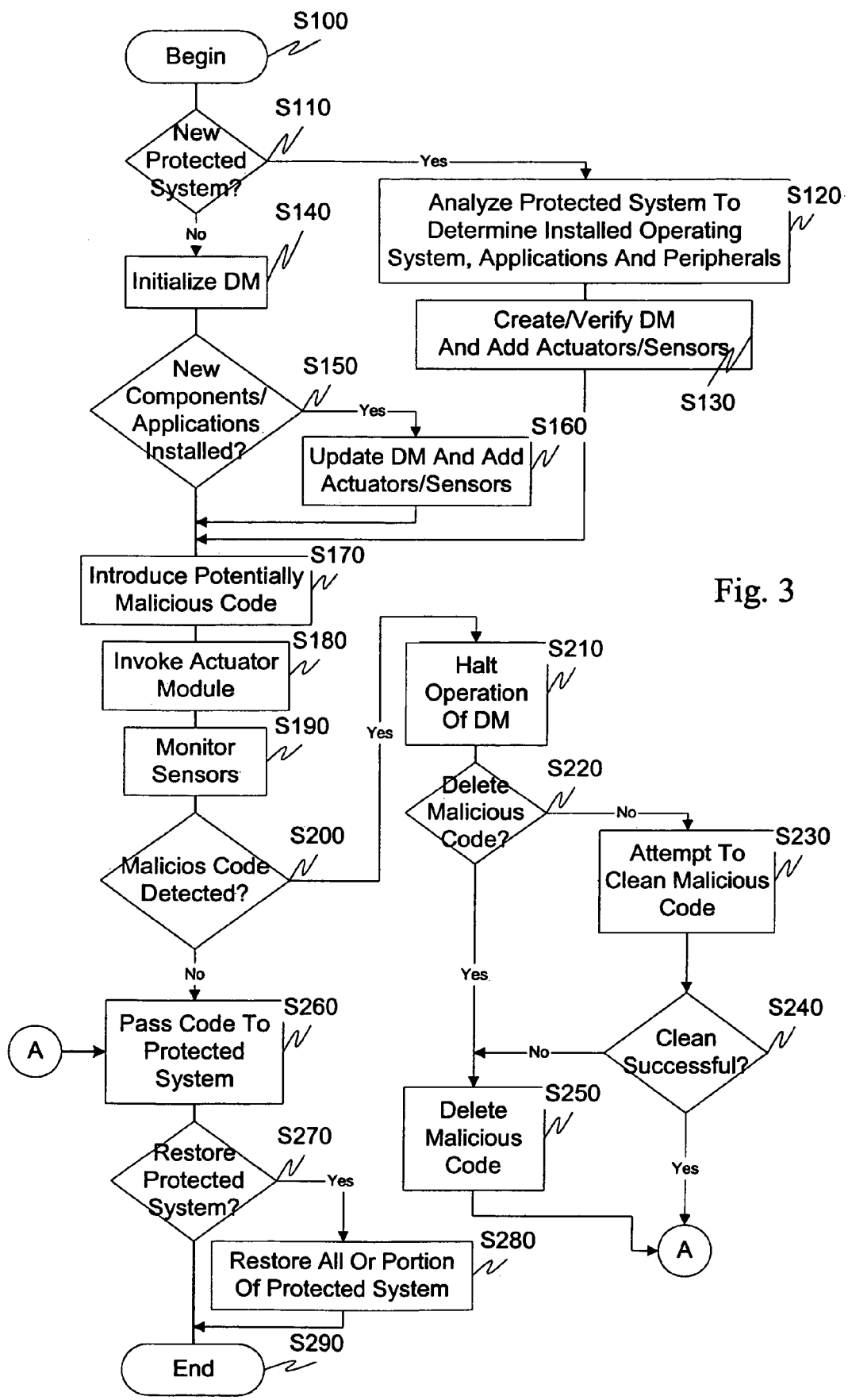
FIG. 3 is a flowchart outlining the exemplary method for creating and maintaining a code inspection system according to this invention.

FIG. 3 is a flow chart illustrating the exemplary method of constructing and monitoring a dynamic decoy machine according to an embodiment of the present invention. In particular, control begins in step S100 and continues to step S110. In step S110, a determination is made whether the protected system is new. If the protected system is new, control jumps to step S120. Otherwise, control continues to step S140. In step S120, the protected system is analyzed to determine, for example, the installed operating system, network parameters, installed applications, installed peripherals, or the like. Next, in step S130, the dynamic decoy machine is created based on the protected system, and optionally, actuator and sensor modules added. Control then continues to step S170.

In step S140, the dynamic decoy machine is initialized. Control then continues to step S150. In step S150, a determination is made whether new components and/or applications have been installed. If new components and/or applications-have been installed, control continues to step S160. Otherwise, control jumps to step S170.

In step S160, the dynamic decoy machine can be updated in real-time, near-real time, or at a predetermined time, and optionally, any sensor and actuator modules added. Control then continues to step S170.

In step S170, the potentially malicious code is introduced to the dynamic decoy machine. Next, in step S180, the actuator module is invoked. Then, in step S190, the sensors are monitored for malicious activity. Control then continues to step S200.

In step S200, a determination is made whether malicious code is detected. If malicious code is detected, control continues to step S210. Otherwise, control jumps to step S260.

In step S210, the operation of the dynamic decoy machine is halted. Next, in step S220, a determination is made whether to delete the malicious code. If the malicious code is to be deleted, control jumps to step S250 where the malicious code is deleted. Otherwise, control continues to step S230.

In step S230, the malicious code is attempted to be cleaned. Control then continues to step S240. In step S240, a determination is made whether the clean was successful. If the clean was successful, control continues to step S2-60. Otherwise, control continues to step S250 where the malicious code is deleted.

In step S260, the code is passed tot he protected computer. Next, in step S270 a determination is made whether to restore all or a portion of the protected system. If a restoration is desired, control continues to step S280 where all or a portion of the protected system is restored. Control continues to step S290 where the control sequence ends.

As shown in FIGS. 1-2, the code inspection system can be implemented either on a single programmed general purpose computer or a separate programmed general purpose computer. However, the code inspection system can also be implemented on a special purpose computer, a programmed microprocessor or microcontroller and peripheral integrated circuit element, an ASIC or other integrated circuit, a digital signal processor, a hardwired electronic or logic circuit such as a discrete element circuit, a programmable logic device such as PLD, PLA, FPGA, PAL, or the like. In general, any device capable of implementing a finite state machine that is in turn capable of implementing the steps illustrated in FIG. 3 can be used to implement the code inspection system according to this invention.

Furthermore, the disclosed method may be readily implemented in software using object or object-oriented software development environments that provide portable source code that can be used on a variety of computer or workstation hardware platforms. Alternatively, the disclosed test chamber management system can be implemented partially or fully in hardware using standard logic circuits or VLSI design. Whether software or hardware is used to implement the systems in accordance with this invention is dependent on the speed and/or efficiency requirements of the system, the particular function, and the particular software and/or hardware systems or microprocessor or microcomputer systems being utilized. However, the code inspection system and method illustrated herein can be readily implemented in hardware and/or software using any know or later-developed systems or structures, devices and/or software by those of ordinary skill in the applicable art from the functional description provided herein and with a general basic knowledge of the computer arts.

Moreover, the disclosed methods may be readily implemented as software executed on a programmed general purpose computer, a special purpose computer, a microprocessor, or the like. In these instances, the methods and systems of this invention can be implemented as a program embedded on a personal computer, such as a JAVA® or CGI script, as a resource residing on a server or workstation, a routine embedded on a dedicated code inspection system, a web browser, a PDA, a dedicated code inspection system, or the like. The code inspection system-can also be implemented by physically incorporating the system into a software and/or hardware system, such as the hardware and software systems of a computer workstation or dedicated code inspection system.

It is, therefore, apparent there has been provided in accordance with the present invention, systems and methods for code inspection. While this invention has been described in conjunction with a number of embodiments, it is evident that many alternatives, modifications, and variations would be or are apparent those of ordinary skill in the applicable art. Accordingly, the invention is intended to embrace all such alternatives, modifications, equivalents and variations that are within the spirit and scope of this invention.

I claim:

1. A code inspection system comprising:
   a code inspection management module that monitors and communicates with a protected system;
   a dynamic decoy system that, in cooperation with the code inspection management module, is updated to substantially parallel relevant portions of the protected system;
   an actuator module; and
   one or more sensor modules, wherein the dynamic decoy system is capable of analyzing at least one of actions and results of one or more portions of code in response to stimuli from the actuator module.

2. The system of claim 1, wherein the actuator module at least one of executes the one or more portions of code, opens the one or more portions of code, inputs information to the one or more portions of code and simulates a passage of time longer than a period of testing.

3. The system of claim 1, wherein the one or more sensor modules detect one or more of unauthorized access attempts, unauthorized command execution attempts and unauthorized modifications to one or more portions of the dynamic decoy machine.

4. The system of claim 1, wherein the protected system is at least one of a computer, a plurality of computers, a network and one or more input devices.

5. The system of claim 1, wherein the dynamic decoy system can be incorporated into a portion of the protected system.

6. The system of claim 5, wherein at least a portion of the code inspection system is in at least one of a BIOS and an operating system of the protected system.

7. The system of claim 1, wherein the relevant portions of the protected system allow the one or more portions of code to be analyzed in the dynamic decoy system as if the dynamic decoy system were the protected system.

8. The system of claim 1, wherein at least a portion of the protected system is capable of being recovered from the dynamic decoy system.

9. The system of claim 1, wherein the code inspection management module monitors the protected system and updates the dynamic decoy system based on at least one of installed software, installed hardware, operating system upgrades, software upgrades, hardware upgrades, software deletions, hardware deletions and input/output devices.

10. The system of claim 1, wherein the code inspection system is an interface between the protected system and one or more unprotected systems.

11. A method of creating and maintaining a dynamic decoy system based on a protected system comprising:
   creating a dynamic decoy system that substantially parallels relevant portions of a protected system;
   updating the dynamic decoy system based on changes to the protected system;
   receiving one or more portions of code;
   introducing the one or more portions of code to the dynamic decoy system;
   simulating operating conditions of the protected system in the dynamic decoy system; and
   monitoring sensors in the dynamic decoy system for at least one of actions or results of the one or more portions of code.

12. The method of claim 11, wherein the relevant portions of the protected system allow the one or more portions of code to be analyzed in the dynamic decoy system as if the dynamic decoy system were the protected system.

13. The method of claim 11, further comprising forwarding approved code to the protected system.

14. The method of claim 11, wherein the dynamic decoy system is an interface between the protected system and one or more unprotected systems.

15. The method of claim 11, further comprising restoring one or more portions of the protected system based on the dynamic decoy system.

16. The method of claim 11, further comprising at least one of deleting and removing at least one unauthorized portion the one or more portions of code.

17. The method of claim 11, further comprising installing one or more sensors in the dynamic decoy system that detect one or more of unauthorized access attempts, unauthorized command execution attempts and unauthorized modifications to one or more portions of the dynamic decoy machine.

18. The method of claim 11, further comprising installing an actuator in the dynamic decoy system.

19. The method of claim 18, wherein the actuator at least one of executes the one or more portions of code, opens the one or more portions of code, inputs information to the one or more portions of code and simulates a passage of time longer than a period of testing.

20. The method of claim 11, wherein updating the dynamic decoy system is based on at least one of installed software, installed hardware, operating system upgrades, software upgrades, hardware upgrades, software deletions, hardware deletions and input/output devices.

21. An information storage media comprising information that creates and maintains a dynamic decoy system based on a protected system comprising:
   information that creates a dynamic decoy system that substantially parallels relevant portions of a protected system;
   information that updates the dynamic decoy system based on changes to the protected system;
   information that receives one or more portions of code;
   information that introduces the one or more portions of code to the dynamic decoy system;
   information that simulates operating conditions of the protected system in the dynamic decoy system; and
   information that monitors sensors in the dynamic decoy system for at least one of actions or results of the one or more portions of code.

22. The media of claim 21, wherein the relevant portions of the protected system allow the one or more portions of code to be analyzed in the dynamic decoy system as if the dynamic decoy system were the protected system.

23. The media of claim 21, further comprising information that forwards approved code to the protected system.

24. The media of claim 21, wherein the dynamic decoy system is an interface between the protected system and one or more unprotected systems.

25. The media of claim 21, further comprising information that restores one or more portions of the protected system based on the dynamic decoy system.

26. The media of claim 21, further comprising information that at least one of deletes and removes at least one unauthorized portion of the one or more portions of code.

27. The media of claim 21, further comprising information that installs one or more sensors in the dynamic decoy system that detect one or more of unauthorized access attempts, unauthorized command execution attempts and unauthorized modifications to one or more portions of the dynamic decoy machine.

28. The media of claim 21, further comprising information that installs an actuator in the dynamic decoy system.

29. The media of claim 28, wherein the actuator at least one of executes the one or more portions of code, opens the one or more portions of code, inputs information to the one or more portions of code and simulates a passage of time longer than a period of testing.

30. The media of claim 21, wherein updating the dynamic decoy system is based on at least one of installed software, installed hardware, operating system upgrades, software upgrades, hardware upgrades, software deletions, hardware deletions and input/output devices.

* * * * *